(12) United States Patent
Noda et al.

(10) Patent No.: US 6,815,393 B2
(45) Date of Patent: Nov. 9, 2004

(54) CATALYST FOR PURIFICATION OF EXHAUST GAS

(75) Inventors: Naomi Noda, Ichinomiya (JP); Junichi Suzuki, Kuwana (JP)

(73) Assignee: NGK Insulators, Ltd. (JP)

( * ) Notice: Subject to any disclaimer, the term of this patent is extended or adjusted under 35 U.S.C. 154(b) by 233 days.

(21) Appl. No.: 09/845,317

(22) Filed: May 1, 2001

(65) Prior Publication Data

US 2001/0056034 A1 Dec. 27, 2001

(30) Foreign Application Priority Data

May 11, 2000 (JP) ........................................ 2000-138822

(51) Int. Cl.⁷ ................................................. B01J 21/08
(52) U.S. Cl. ........................ 502/243; 502/250; 502/251
(58) Field of Search ................................. 502/243, 250, 502/261, 262, 263, 242

(56) References Cited

U.S. PATENT DOCUMENTS

| | | | |
|---|---|---|---|
| 5,153,153 A | * 10/1992 | Freudenberg et al. | ....... 501/127 |
| 5,288,672 A | * 2/1994 | Gugel et al. | ................. 501/134 |
| 5,985,220 A | * 11/1999 | Hughes | ....................... 422/177 |
| 6,555,081 B2 | * 4/2003 | Hori et al. | ................ 423/239.1 |

FOREIGN PATENT DOCUMENTS

| | | | |
|---|---|---|---|
| EP | 0 787 522 A2 | 2/1996 | |
| EP | 0 982 066 A1 | 8/1998 | |
| EP | 1 112 774 A2 | 12/1999 | |
| JP | 57140645 | 2/1981 | |
| JP | 10-165817 | 6/1998 | |
| WO | WO 9747864 A1 | * 12/1997 | ........... F01N/03/20 |

* cited by examiner

Primary Examiner—Stanley S. Silverman
Assistant Examiner—Edward M. Johnson
(74) Attorney, Agent, or Firm—Parkhurst & Wendel, L.L.P.

(57) ABSTRACT

A catalyst for purification of exhaust gas includes a carrier, and a catalyst layer containing an alkali metal and/or an alkaline earth metal as an $NO_x$-adsorbing component, the catalyst layer being loaded on the carrier, in which catalyst the carrier-composing material contains Si in an amount of 0.5 to 10.0% by weight as expressed as an oxide. Since the inclusion of Si can suppress the deterioration of the carrier caused by the alkali metal and/or the alkaline earth metal during the use of the catalyst, the catalyst can be used over a long period.

7 Claims, No Drawings

CATALYST FOR PURIFICATION OF EXHAUST GAS

BACKGROUND OF THE INVENTION (1) Field of the Invention

The present invention relates to a catalyst for purification of exhaust gas, containing an alkali metal and/or an alkaline earth metal as an $NO_x$-adsorbing component, particularly a catalyst for purification of an exhaust gas emitted from an internal combustion engine of gasoline vehicle, diesel vehicle or the like.

(2) Description of Related Art

In recent years, regulation for exhaust gas has become stricter, and lean burn engines, direct injection engines, etc. have come into wide use. In this connection, $NO_x$-adsorbing catalysts capable of effectively purifying the $NO_x$ present in ah exhaust gas, in a lean atmosphere have been put into practical use. As the $NO_x$-adsorbing component used in the $NO_x$-adsorbing catalyst, there are known alkali metals such as K, Na, Li, Cs and the like; alkaline earth metals such as Ba, Ca and the like; and rare earth elements such as La, Y and the like. Recently, it has been attempted to use, in particular, K which is superior in $NO_x$ adsorption at high temperatures.

$NO_x$-adsorbing catalysts are generally constituted by loading a catalyst layer containing the above-mentioned $NO_x$-adsorbing component, on a carrier composed of an oxide type ceramic (e.g. cordierite) or a metallic material (e.g. Fe—Cr—Al alloy). Such a carrier, however, has a problem; that is, it is easily corroded and deteriorated by alkali metals or part of alkaline earth metals, particularly, Li, Na, K and Ca when they become active under the high temperatures of exhaust gas.

SUMMARY OF THE INVENTION

In view of the above problem of the prior art, the present invention aims at providing a catalyst for purification of exhaust gas, obtained by loading, on a carrier, a catalyst layer containing an alkali metal and/or an alkaline earth metal as an $NO_x$-adsorbing component, which catalyst can suppress the deterioration of the carrier caused by the alkali metal and/or the alkaline earth metal and therefore can be used over a long period of time.

According to the present invention, there is provided a catalyst for purification of exhaust gas comprising: a carrier, and a catalyst layer containing an alkali metal and/or an alkaline earth metal, the catalyst layer being loaded on the carrier, in which catalyst the carrier-composing material contains Si in an amount of 0.5 to 10.0% by weight as expressed as an oxide.

DESCRIPTION OF PREFERRED EMBODIMENTS

In the catalyst of the present invention, an alkali metal and/or an alkaline earth metal is used as the $NO_x$-adsorbing component, and a catalyst layer containing the component is loaded on a carrier composed of a material containing a given amount of Si. It is known that Si has high reactivity with alkali metals and alkaline earth metals and can easily form a compound oxide therewith. Hence, in the present invention, a small amount of Si (Si is reactive with alkali metals and alkaline earth metals as mentioned above) is allowed to be present in the material composing the carrier, or a carrier-composing material inherently containing a small amount of Si is used, whereby the alkali metal and/or the alkaline earth metal (which is an $NO_x$-adsorbing component and deteriorates the carrier) is allowed to react preferentially with the Si. As a result, the reaction of the alkali metal and/or the alkaline earth metal with the carrier-composing major component (other than Si) is suppressed and the deterioration of the carrier is suppressed.

In general, carrier-composing materials decrease their strengths when they are exposed to high temperatures together with an alkali metal-containing catalyst layer. However, when they contain a small amount of Si therein, their initial strength can be increased and, as a result, they can possess a strength necessary for catalyst carrier even if their strength is slightly decreased, for example, when they are exposed to high temperatures with an alkali-containing catalyst layer. Such an effect brought about by the inclusion of Si is striking in catalyst-composing ceramic materials, particularly in ceramic materials wherein the particles of the major component contain no Si therein and the bonding between the particles is relatively weak, such as alumina, aluminum titanate and the like. It is because Si bond the particles at the boundaries or assists such bonding.

In the present invention, the content of Si in the carrier-composing material is specifically 0.5 to 10.0% by weight, preferably 1.0 to 6.0% by weight, more preferably 2.0 to 5.0% by weight as expressed as an oxide content. When the content is less than 0.5% by weight, the effect by Si of protecting the catalyst-composing major component from the deterioration by alkali metal or alkaline earth metal is insufficient. A Si content of more than 10.0% by weight is not preferred because when there is used, as an alkali metal, K which is superior in $NO_x$-adsorption at high temperatures and which has recently drawn attention as an $NO_x$-adsorbing component, the reaction product between this K and Si increases the thermal expansion coefficient of the total carrier. When the content is less than 1.0% by weight, if the carrier is highly porous, the alkali metal or the alkaline earth metal diffuses easily into the inside of the carrier and the effect by Si of protecting the carrier-composing major component is insufficient. A content of more than 6.0% by weight is not preferred because when K is used as an $NO_x$-adsorbing component, the reaction product between this K and Si decreases the softening point of the total carrier.

For the above-mentioned increase in initial strength, a Si content of 0.7% by weight or more as expressed as an oxide is effective. A Si content of 1.5% by weight or more is more preferred because a sufficient effect can be obtained. At a Si content of more than 8% by weight, however, the effect of initial strength increase levels off.

Si contained in the carrier-composing material can play it role even when present inside the particles of the carrier-composing major component or inside the particles of the carrier-composing minor component. However, in order for Si to effectively protect the particles of the carrier-composing major component from the deterioration, Si is preferably present at the particle boundaries or on the particles of the carrier-composing major component. As a matter of course, Si may be present in a mixed form of the above presences. When the carrier-composing material is aluminum titanate, the material may preferably contain further Mg and/or Fe in order to suppress the thermal decomposition at high temperatures and increase the strength.

In the catalyst of the present invention, when it is used for purification of exhaust gas from automobile (in this case, the catalyst is inevitably exposed to high temperatures), the carrier is allowed to have a thermal expansion coefficient of preferably $6.0 \times 10^{-6}/°$ C. or less, more preferably $2.0 \times 10^{-6}/°$ C. or less, further preferably $1.0 \times 10^{-6}/°$ C. or less in view of the thermal shock resistance, etc. When K is used as an $NO_x$-adsorbing component, the carrier is allowed, by the control of Si content therein, to have a thermal expansion coefficient of preferably $6.0 \times 10^{-6}/°$ C. or less, more preferably $4.0 \times 10^{-6}/°$ C. or less even after a K-containing catalyst layer has been loaded on the carrier and the resulting material has been heat-treated at 850° C. for 50 hours.

In the present invention, the carrier has a porosity of preferably 5 to 50%, more preferably 10 to 40%, further preferably 10 to 25%. When the porosity of the carrier is less than 5%, the carrier has a problem in coatability of catalyst layer thereon. When the porosity is more than 50%, the carrier has an insufficient strength. A porosity of 25% or less is preferred because it suppresses the diffusion of alkali metal or alkaline earth metal into carrier.

The present invention is effective when applied to various carrier-composing materials. Therefore, there is no particular restriction as to the kind of the carrier-composing material used, and ceramic, metallic and other materials can be used. The present invention is suitably applied to, for example, alumina, zirconia, titania, spinel (these are ceramics), zirconia type oxide typified by zirconyl phosphate, alumina type oxide typified by aluminum titanate, and titania type oxide. Of these, zirconyl phosphate, aluminum titanate, etc. all having a low thermal expansion coefficient are particularly preferred. Incidentally, Si may be inherently present in the catalyst-composing material, or may be added to pure crystals containing no Si.

The carrier has no particular restriction as to the shape. Therefore, the above-mentioned effect of deterioration suppression is obtained when the carrier takes any of a cell structure (e.g. a monolithic honeycomb or a ceramic foam), pellets, beads, ring, etc. The effect is largest when the carrier is a honeycomb carrier constituted by a large number of through-holes (cells) surrounded by thin partition walls. The sectional shape, i.e. cell shape of each through-hole of this honeycomb carrier may be any of a circle, a polygon, a corrugation, etc. In recent years, $NO_x$-adsorbing catalysts have become to adopt a hexagonal cell in addition to conventional triangular and tetragonal cells, for uniform coating of catalyst layer. Therefore, application of the present invention to these honeycomb carriers is one preferred embodiment of the present invention. The shape of the honeycomb carrier may also be formed so as to fit the interior shape of the exhaust gas system in which the present catalyst is disposed.

The alkali metal and/or the alkaline earth metal contained in the catalyst layer as an $NO_x$-adsorbing component has no particular restriction as to the kind. There can be mentioned, for example, as alkali metals, Li, Na, K and Cs and, as alkaline earth metals, Ca, Ba and Sr. When of these, an alkali metal having high reactivity with Si, particularly K is used as an $NO_x$-adsorbing component, the effect of the present invention is largest.

The catalyst layer may contain, in addition to the $NO_x$-adsorbing component such as alkali metal or alkaline earth metal, a noble metal such as Pt, Pd, Rh or the like. These noble metals allow the NO and $O_2$ present in exhaust gas to react with each other prior to the adsorption of $NO_x$ by alkali metal or alkaline earth metal, and generate $NO_2$, or, when the once-adsorbed $NO_x$ is released, allow the $NO_x$ to react with combustible components in exhaust gas and make them harmless. The material composing the catalyst layer is preferably a heat-resistant inorganic oxide having a large specific surface area, such as $\gamma$-$Al_2O_3$ so that an $NO_x$-adsorbing component and a noble metal both mentioned above can be loaded thereon in a highly dispersed state.

The present invention is described in more detail below by way of Examples. However, the present invention is in no way restricted to the Examples.

[Preparation of Slurries for Washcoating for Formation of $NO_x$-adsorbing Catalyst Layer]

A commercial $\gamma$-$Al_2O_3$ powder having a specific surface area of 200 m$^2$/g was immersed in a solution obtained by mixing an aqueous $(NH_3)_2Pt(NO_2)_2$ solution and an aqueous $KNO_3$ solution. The resulting material was stirred in a pot mill for 2 hours and then subjected to evaporation to dryness to remove the water. The water-removed material was subjected to dry disintegration and then fired in an electric furnace at 600° C. for 3 hours. To the thus-obtained (Pt+K)-predoped $\gamma$-$Al_2O_3$ powder were added an $Al_2O_3$ sol and water. The resulting mixture was subjected to wet grinding in a pot mill to prepare a slurry for wash coating. The quantitative relation of $\gamma$-$Al_2O_3$, Pt and K was adjusted at the stage of the above mixing and immersion so that when the slurry was washcoated on a honeycomb carrier and the coated honeycomb carrier was fired, the amount of catalyst layer loaded was 100 g per liter of honeycomb carrier, the amount of Pt was 30 g per cft of honeycomb carrier (1.06 g per liter), and the amount of K was 20 g per liter of honeycomb carrier. The $Al_2O_3$ sol was added in such an amount that its solid content became 5% by weight of the total $Al_2O_3$; and the water was added in such an amount that the slurry obtained had a viscosity appropriate for wash coating.

[Preparation of Samples]

First, there were prepared 6 kinds of aluminum titanate honeycomb carriers containing Si in an amount of 0% by weight, 0.2% by weight, 1.5% by weight, 3.0% by weight, 5.5% by weight or 12.0% by weight [each honeycomb carrier had a partition wall thickness of 6 mil (0.15 mm), a cell density of 400 cpsi (62 cells/cm$^2$) and a tetragonal cell shape]. A step of washcoating the above-prepared slurry on each honeycomb carrier and drying the coated honeycomb carrier was repeated until the amount of the catalyst layer loaded became 100 g per liter of honeycomb carrier. Then, each resulting honeycomb carrier was fired in an electric furnace at 600° C. for 1 hour to obtain $NO_x$-adsorbing catalysts 1 to 6.

[Durability Test]

Each of the $NO_x$-adsorbing catalysts 1 to 6 was subjected to an accelerated durability test in an electric furnace at 850° C. for 50 hours in the presence of 10% of water.

[Evaluation]

Each of the $NO_x$-adsorbing catalysts 1 to 6 was measured for initial bending strength, bending strength after durability test, initial thermal expansion coefficient and thermal expansion coefficient after durability test. The results are shown in Table 1.

TABLE 1

| | Si content in carrier (wt. % as oxide) | Bending strength (kgf/mm$^2$) | | Thermal expansion coefficient (×10$^{-6}$/° C.) | |
|---|---|---|---|---|---|
| | | Initial | After durability test | Initial | After durability test |
| NO$_x$-adsorbing catalyst 1 (Comparative Example) | 0 | 0.34 | 0.15 | 0.41 | 1.37 |
| NO$_x$-adsorbing catalyst 2 (Comparative Example) | 0.2 | 0.38 | 0.20 | 0.46 | 1.43 |
| NO$_x$-adsorbing catalyst 3 (Example) | 1.5 | 0.74 | 0.48 | 0.51 | 1.79 |
| NO$_x$-adsorbing catalyst 4 (Example) | 3.0 | 0.83 | 0.52 | 0.53 | 1.85 |
| NO$_x$-adsorbing catalyst 5 (Example) | 5.5 | 0.97 | 0.66 | 0.72 | 2.01 |
| NO$_x$-adsorbing catalyst 6 (Comparative Example) | 12.0 | 0.96 | 0.64 | 2.13 | 4.06 |

As shown in Table 1, the NO$_x$-adsorbing catalysts 3 to 5 according to the present invention gave good results in both bending strength and thermal expansion coefficient. Similar results were obtained also when the cell structure of the aluminum titanate honeycomb carrier was changed to a partition wall thickness of 4 mil (0.10 mm) and a cell density of 400 cpsi (62 cells/cm$^2$), or 3 mil (0.075 mm) and 600 cpsi (93 cells/cm$^2$), or 2 mil (0.05 mm) and 900 cpsi (139.5 cells/cm$^2$) or when the cell shape was changed to a hexagon.

As described above, in the catalyst for purification of exhaust gas according to the present invention, Si (which has high reactivity with the alkali metal or alkaline earth metal used in the catalyst layer as an NO$_x$-adsorbing component) is present in a given amount in the carrier-composing material; therefore, when the catalyst is exposed to high temperatures, the alkali metal or alkaline earth metal in the catalyst layer reacts preferentially with the Si and the reaction of the metal with the carrier-composing major component is suppressed. As a result, the deterioration of the carrier by the alkali metal or alkaline earth metal is suppressed and the catalyst can be used over a long period of time. Further, the presence of a given amount of Si in the carrier-composing material allows the carrier to have a higher initial strength and, resultantly, the carrier can have a strength necessary for catalyst carrier even after the carrier has been exposed to high temperatures together with the alkali metal-containing catalyst layer and its strength has decreased slightly.

What is claimed is:

1. A catalyst for purification of exhaust gas comprising:
 a carrier, and
 a catalyst layer containing an alkali metal and/or an alkaline earth metal, the catalyst layer being loaded on the carrier,
in which catalyst said carrier is a honeycomb carier having thin partition walls and through-holes defined by the partition walls and said partition walls contain Si in an amount of 0.5 to 10.0% by weight as expressed as an oxide sufficient to prevent deterioration of the honeycomb carrier.

2. A catalyst for purification of exhaust gas according to claim 1, wherein said carrier contains Si in an amount of 1.0 to 6.0% by weight as expressed as an oxide.

3. A catalyst for purification of exhaust gas according to claim 1, wherein the carrier has a thermal expansion coefficient of 6.0×10$^{-6}$/° C. or less.

4. A catalyst for purification of exhaust gas according to claim 1, wherein said carrier is aluminum titanate.

5. A catalyst for purification of exhaust gas according to claim 4, wherein said carrier further contains Mg and/or Fe.

6. A catalyst for purification of exhaust gas according to claim 1, wherein the catalyst layer contains K.

7. A catalyst for purification of exhaust gas according to claim 1, wherein the catalyst layer contains at least one kind of noble metal selected from Pt, Pd and Rh.

* * * * *